H. B. PUSHEE.
TIRE REPAIR MATERIAL.
APPLICATION FILED MAR. 17, 1921.
1,403,058.
Patented Jan. 10, 1922.
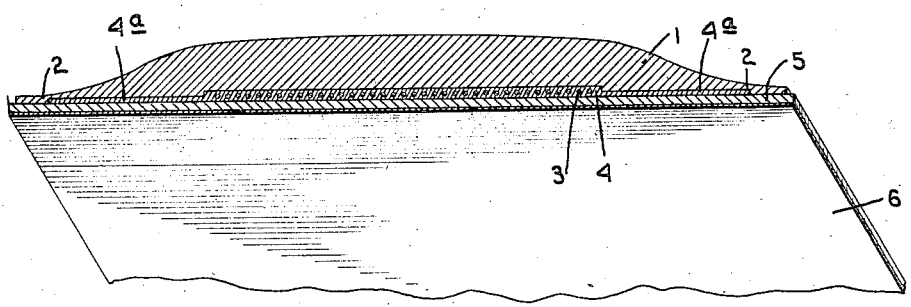
Harold B. Pushee
INVENTOR.
BY
ATTORNEY.

UNITED STATES PATENT OFFICE.

HAROLD B. PUSHEE, OF AKRON, OHIO, ASSIGNOR TO THE GENERAL TIRE AND RUBBER COMPANY, OF AKRON, OHIO, A CORPORATION OF OHIO.

TIRE REPAIR MATERIAL.

1,403,058.  Specification of Letters Patent.  Patented Jan. 10, 1922.

Application filed March 17, 1921. Serial No. 453,118.

*To all whom it may concern:*

Be it known that I, HAROLD B. PUSHEE, a citizen of the United States, residing at Akron, in the county of Summit and State of Ohio, have invented certain new and useful Improvements in Tire Repair Materials, of which the following is a specification.

This invention relates to repair material for use in repairing or retreading tire casings it being an object of the invention to combine the several elements in such form that the work of the repair man will be materially reduced.

In the retreading of tire casings it is the practice to remove the tread, breaker and cushion down to the carcass and to apply the several strips from separate supplies or reels, the surface of the carcass being prepared in the well known manner. It has been the general practice heretofore, to furnish each of the elements which go into the tread strip in a separate roll, which has necessitated keeping on hand in the repair shop supplies of cushion rubber, breaker strip properly rubberized and tread gum. Each of the materials is rolled up in a cotton liner and is sold as a separate element to be applied separately to the tire, and each strip must be prepared before it can be applied to the tire, by washing off the "bloom" with a gasoline swab or similar means.

My present invention is designed to overcome some of the difficulties and disadvantages which have been encountered in the selling of the material and to facilitate and improve upon the methods of repairing in use heretofore.

In the drawing there is shown one form of the invention it being understood that details may be varied without departing from the scope of the invention.

In the single figure of the drawing the improved form of tire repair material is shown, the view being taken looking at the end of the strip.

By my present invention it is designed to unite the tread rubber, the rubberized breaker strip and the cushion in one piece, and to sell such a composite strip to the trade for repair purposes, eliminating the necessity of furnishing a plurality of these strips. As a result, the work of retreading is reduced from three operations to one operation and the several layers are correctly positioned with respect to one another.

In the drawing 1 represents a tread strip which is formed of uncured rubber properly compounded to be tough and suitable for a tire tread. It will be noted that the strip 1 is thicker in the center to give the proper depth to the tread, and that it is brought to thin feather edges at the sides 2, so that when it is applied to the tire it will gradually taper off toward the side wall. Centrally located on the lower or inner side of the tread is a strip of loosely woven fabric 3 known in the art as the "breaker strip", this strip having been previously calendered or coated with a filling of uncured rubber 4 of suitable composition, strips of rubber $4^a$ of a composition similar to the rubber about the breaker may be applied at the sides of the breaker extending outwardly to or near the edge of the tread for the purpose of improving the union between the tread and the cushion.

Beneath the tread and firmly attached thereto, is a layer of uncured cushion stock 5. This cushion stock is preferably a high grade of gum and extends over the entire under surface of the tread strip and may overlap or extend beyond the edges of the tread to a slight extent.

Over the surface of the cushion stock is placed a layer of protecting material 6, usually the well known holland, which preserves the face of the fresh uncured rubber cushion and protects it from dirt and injury through handling, being removed by the repairman before application to the tire.

The composite strip is sold to the tire repair trade in the form shown in suitable lengths. The repair man having first prepared a tire casing for the reception of the tread cuts off a strip of the proper length and then removes the protecting layer 6. The composite strip is then placed about the tire with the fresh unsoiled raw rubber strip 5 against the surface of the casing and is then rolled in place to form a firm adhesion with the casing and to eliminate any air which may have been trapped between the tread and the casing, after which the tread is vulcanized.

Several advantages are secured by the new form of repair material forming this invention. Whereas each of the three elements were required to be prepared and applied to the tire casing separately in a retreading operation, the several strips are eliminated and the application of the different kinds of rubber and breaker is done in one operation. The danger of trapping air between the several components of the tread is done away with, and the different rubber layers are accurately positioned with respect to one another.

Other objects and advantages will be apparent from the description and details may be modified without departing from the invention herein described.

I claim:

A repair strip for use in repairing tires, comprising a layer of tough, uncured rubber suitable for the tread of a tire, said layer being of greater thickness at the center and tapering to thin edges, a layer of fabric, a coating of uncured rubber about the fabric, said fabric being of a character to serve as a breaker strip, and being of substantially less width than the tread, adhering to the tread and located centrally with respect thereto, and a layer of high grade uncured rubber suitable for a cushion stock over the breaker strip and secured thereto and to the edges of the tread strip, and a removable protective fabric over the surface of the cushion layer.

HAROLD B. PUSHEE.